UNITED STATES PATENT OFFICE.

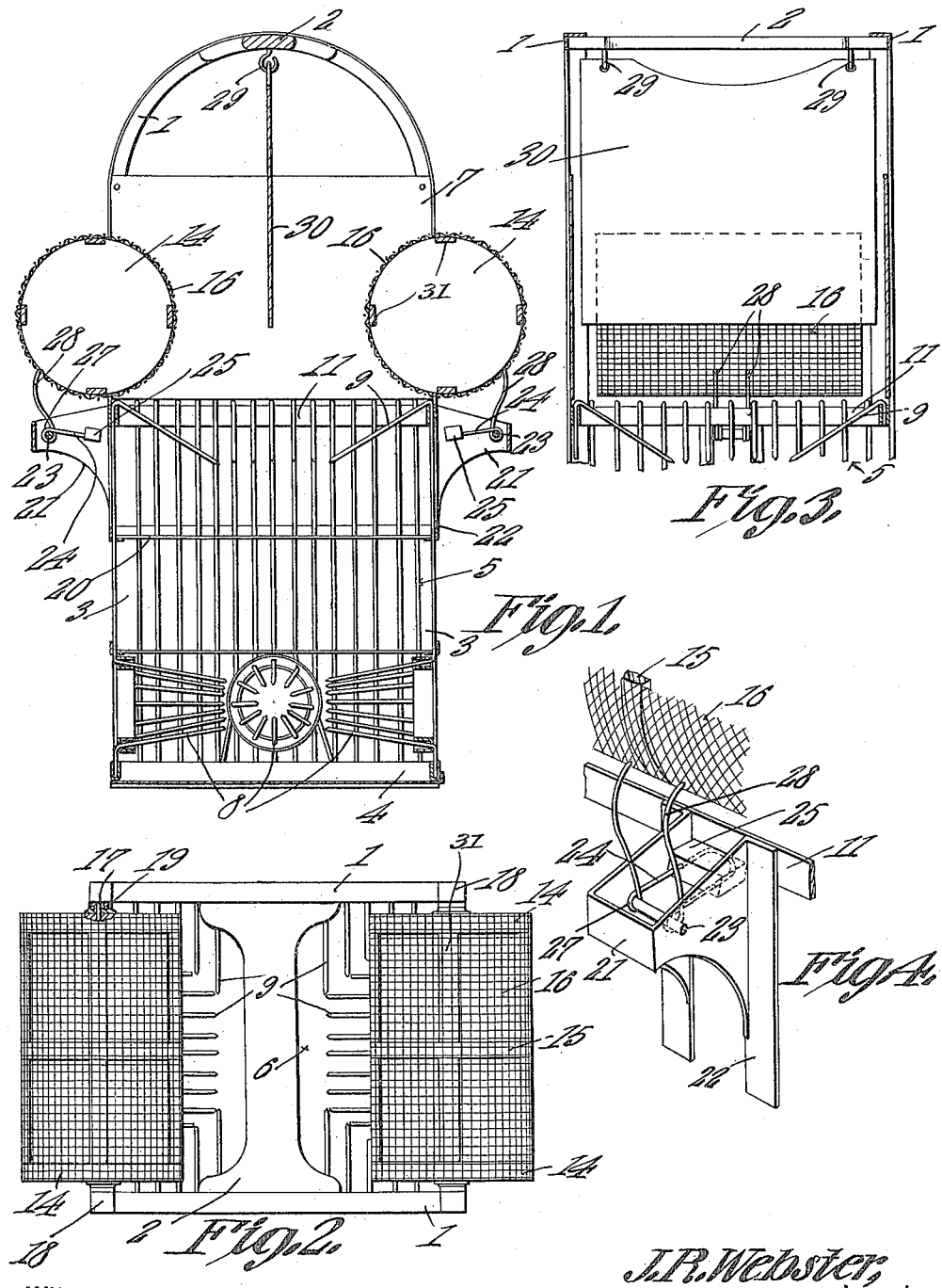

JOSEPH R. WEBSTER, OF DALHART, TEXAS.

TRAP.

1,161,558. Specification of Letters Patent. Patented Nov. 23, 1915.

Application filed May 11, 1915. Serial No. 27,364.

*To all whom it may concern:*

Be it known that I, JOSEPH R. WEBSTER, a citizen of the United States, residing at Dalhart, in the county of Dallam and State of Texas, have invented a new and useful Trap, of which the following is a specification.

The device forming the subject matter of this application is an animal trap, and the invention aims to provide, in a trap of the type described, a novel form of rotating cylinder which constitutes a means for projecting into the contour of the trap, an animal which alights upon the cylinder.

Another object of the invention is to provide a trap embodying opposed rotatable cylinders adapted to project an animal into the trap, novel means being provided for preventing the animal from jumping from one cylinder to the other, said means being movable so that the animal may pass through a restricted throat or opening existing in the supporting frame of the trap below the cylinders.

It is within the province of the disclosure to improve the construction of the cylinder and to improve the construction of the pawl and ratchet mechanism whereby the cylinder is prevented from having a retrograde movement.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing: Figure 1 shows the invention in vertical section; Fig. 2 is a top plan; Fig. 3 is a fragmental vertical section at right angles to the cutting plane of Fig. 1; Fig. 4 is a perspective detail illustrating a portion of one cylinder and the pawl mechanism which coacts therewith.

The trap forming the subject matter of this application embodies a pair of arched top frames 1 connected by a tie bar 2, the frames 1 being prolonged downwardly to form posts 3 connected with a bottom 4. Surrounding the posts 3 is a wall 5 which may be of any desired construction, the wall in the present instance being depicted as comprising upright bars. The wall is reinforced by a top frame 11 and by one or more intermediate frames 20. The wall 5 and the bottom 4 coöperate to form a compartment in which the trapped animals are caged, the compartment being denoted by the numeral 6. The posts 3 of the respective top frames 1 are connected above the wall 5 by means of side plates 7. Conical leaders 8 form entrances for the compartment defined by the wall 5 and the bottom 4, the construction being such that although an animal may readily enter the compartment by way of the leaders 8, egress from the compartment by way of the leaders will be difficult. Projecting inwardly and downwardly from the frame 11 are prongs or guards 9 which define a restricted opening or throat adjacent the geometrical center of the trap.

The invention comprises a pair of opposed cylinders, each cylinder comprising end walls 14, an intermediate reinforcing ring 15, a foraminous shell 16, and longitudinal reinforcing bars 31. The end walls of the cylinders are provided with shafts 17 journaled for rotation in bearings 18 on the posts 3, the shafts 17 preferably being supported on anti-friction balls 19. The cylinders, as clearly shown in Fig. 1 project outwardly beyond the sides of the body portion of the trap, so that an animal may alight readily on the cylinders. Pawl mechanisms are provided for preventing a retrograde rotation of the cylinders, and with this end in view, U-shaped brackets 21 are provided, the same being equipped with laterally extended feet 22 the ends of which are secured to the frames 11 and 20. Connecting the side portions of the bracket 21 is a shaft 23.

The invention includes a U-shaped lever 24, the bend of which carries a weight 25, the side arms of the lever being bent as shown at 27 around the shaft 23, to form bearings, the extremities of the arms of the lever being upwardly extended to form pawls 28 which coact with the shell 16 of each cylinder to prevent a retrograde movement of the cylinder. The tie bar 2 is provided with hooks 29 or other supporting elements upon which is pivotally mounted a depending baffle 30, preferably in the form of a plate, the baffle extending between the opposed cylinders as Fig. 1 will most clearly show.

In practical operation, the trap forming the subject matter of this application is employed in connection with a pair of opposed runways (not shown) which runways may be merely a pair of inclined boards sloping downwardly from the cylinders. An animal traversing either of the runways, and alighting on either of the cylinders, cannot rotate the cylinders backwardly, owing to the coaction between the pawls 28 and the foraminous shell 16 of each cylinder. The cylinders are free to rotate inwardly, or toward each other, and thus an animal alighting upon either cylinder, will be projected downwardly into the body portion of the trap. The baffle 30 prevents an animal from jumping from one cylinder to another, after the rotation of one cylinder has begun, and owing to the fact that the baffle is pivotally mounted, the same is adapted to swing to one side, thereby permitting the animal which is being projected downwardly into the trap, to pass through the restricted throat or opening defined by the downwardly and inwardly extended guards 9.

Especial attention is directed to the fact that the shell 16 of each cylinder is fashioned from foraminous material. Owing to the character of the material out of which the shell is made, the upper ends of the pawls 28 are adapted to coact therewith to hold the cylinders against retrograde rotation, the shells serving as ratchet wheels which coact with the pawls 28. It is therefore unnecessary to provide the cylinders with toothed ratchet wheels. It is to be observed, further, that the ring 15 lies between the pawls 28 and serve to reinforce the shell 16 so as to enable the same to withstand the strains imposed thereon by the pawls 28. The weight 25 normally tends to maintain the pawls 28 engaged with the shell 16 and therefore the pawls are always in effective positions. The function of the side plates 7 is to prevent an animal from jumping out of the trap after the cylinders have started to rotate inwardly.

The tie bar 2 not only serves as a support for the swinging baffle 30 but, as well, constitutes a handle whereby the trap may be carried about.

Having thus described the invention, what is claimed is:—

1. In a trap, a frame; guides projecting inwardly from the frame and defining a restricted opening; opposed cylinders journaled on the frame; means for preventing a reverse rotation of the cylinders; and a frame supported baffle located between the cylinders, the baffle being pivotally mounted, to permit an animal projected from either cylinder to pass through the restricted opening.

2. In a trap, a frame; a cylinder journaled on the frame; and a pawl pivotally mounted on the frame and coacting with the cylinder to prevent a retrograde movement thereof, the cylinder constituting means for projecting an animal within the contour of the frame, the cylinder comprising a foraminous shell coacting with the pawl and forming a ratchet wherewith the pawl engages.

In testimony that I claim the foregoing as my own, I have hereto affixed my signature in the presence of two witnesses.

JOSEPH R. WEBSTER.

Witnesses:
PEM DENTON,
B. F. NEVILL.

Copies of this patent may be obtained for five cents each, by addressing the "Commissioner of Patents, Washington, D. C."